United States Patent
Corey

[15] 3,678,746
[45] July 25, 1972

[54] FLUIDIC SENSOR FOR FLUID STREAM VELOCITY

[72] Inventor: Victor B. Corey, Bellevue, Wash.
[73] Assignee: Sundstrand Data Control, Inc.
[22] Filed: June 10, 1970
[21] Appl. No.: 45,029

[52] U.S. Cl. .........................73/194 R, 73/205 R, 137/81.5
[51] Int. Cl. ........................................................G01f 1/00
[58] Field of Search...................73/189, 194 R, 205 R, 212; 137/81.5

[56] References Cited

UNITED STATES PATENTS 3,343,413  9/1967  South et al. ..........................73/205 X
3,208,463  9/1965  Hurvitz................................137/81.5

*Primary Examiner*—Jerry W. Myracle
*Attorney*—Hofgren, Wegner, Allen, Stellman & McCord

[57] ABSTRACT

A method and apparatus for determining the velocity of a fluid flow stream. A fluid jet source is disposed opposite a pair of fluid pressure detectors so that the jet stream equally intersects both detectors when the velocity of the fluid flow stream is zero. Means are provided for relatively laterally displacing the jet with respect to the detectors, and for sensing the pressure difference at the detectors, in order to indicate the velocity of the moving fluid flow stream.

17 Claims, 5 Drawing Figures

Patented July 25, 1972

INVENTOR
Victor B. Corey
BY Hofgren, Wegner, Allen, Stellman & McCord
ATTORNEYS

3,678,746

FLUIDIC SENSOR FOR FLUID STREAM VELOCITY

BACKGROUND OF THE INVENTION

Heretofore, a number of true air speed indicators have been used in airborne vehicles, most of which utilize the difference between ram pressure and static pressure to provide an indication of true air speed. Such devices, however, are generally limited to applications where the air stream velocity to be determined coincides with the direction of travel of the airborne vehicle, and where the ram pressure is due solely to the velocity of the airborne vehicle itself. This is sufficiently critical to require positioning a pitot tube forward of the leading edge of the wing, or portion of the fuselage, so that there is no disturbance due to the airfoil when the pressures are compared. Furthermore, these systems typically provide accurate air speed indication only over a portion of the speed range of the aircraft.

Another system heretofore proposed for the measurement of fluid stream velocities of very low magnitudes is described in Aeronautical Report LR-472 of the National Research Council of Canada, February 1967, by J.W. Tanney. In that system, an air jet stream is directed through an air fluid stream, the velocity of which is to be measured, in a direction which is at right angles to the direction of flow of the air fluid stream. A pair of pressure receivers are disposed symmetrically with respect to the undisturbed air jet stream, so that the influence of the fluid stream upon the jet stream may be detected. When the fluid stream has a velocity component normal to the jet stream direction and in the plane of the detectors, the jet stream will be diverted and bent in the downstream direction of the fluid stream by an amount proportional to the velocity of the fluid stream, and unequal pressures will be detected by the receivers. The pressure differential between the receivers is used as a measure of the velocity of the fluid stream moving normal to the sensitive axis. This method is satisfactory in the lower velocity ranges typically from about 0.1 to 10 knots (nautical miles per hour), but has not been found suitable for higher flow velocities.

SUMMARY OF THE INVENTION

This invention relates generally to a method and apparatus for determining the velocity of a relatively moving fluid stream over a substantial range of speeds, and more particularly to a true air speed indicating device for vehicles.

The operating principles of the present apparatus can be explained in terms of the mass-flow relationship between two fluid masses, the trajectories of which intersect each other at right angles. As the two fluid masses intersect, the resultant flow of fluid will be in a new direction which is determined by the momentum and viscous properties of the respective fluid masses. And, since in the subject apparatus the angle of intersection is defined by the orientation of the detection apparatus with relation to the impinging fluid flow stream, this phenomenon can be used to enable the determination of the velocity of the fluid flow stream.

Given a supply jet, which emits a diverging flow of fluid with no intersecting fluid stream impinging thereon, two pressure detectors, disposed in side-by-side relation downstream of the jet and within the diverging jet flow path, will be subjected to equal pressures. If another fluid flow stream is now caused to intersect the jet stream at right angles thereto, and in the plane of the detectors, it will tend to bend the jet stream toward the downstream direction of the fluid flow stream so that although the jet stream continues to cross through the fluid flow stream and toward the two detectors, the resultant bending action of the jet stream caused by the impinging fluid stream will tend to deflect the jet stream so that it fails to exert equal pressures on both detectors.

Likewise, if the fluid flow stream velocity is further increased, the jet stream trajectory may be sufficiently deflected so as not to intersect either of the detectors. However, so long as the momentum of the jet stream is sufficient to cause it to pass through the fluid flow stream to the detector side of the flow stream, one can cause the deflected jet stream to again impinge equally upon both detectors by relatively moving the position of the supply jet in the upstream direction of the fluid flow stream. The distance which the supply jet must be moved upstream, or the detectors must be moved downstream, will be proportional to the velocity of the fluid flow stream so long as the jet stream velocity is maintained substantially constant. Thus, by providing a measure of the distance over which the apparatus must be moved to maintain equal pressures on the detectors, a proportional measure of the velocity of the incident flow stream is obtained.

The detector of the present invention may also be used to determine the relative velocity of a fluid passing over any portion of the vehicle to which it is mounted, both in the direction of movement of the vehicle and in cross directions. A plurality of these devices could be positioned at a number of critical positions on the outer skin of any high speed vehicle in order to give an indication of the true relative velocity of the air stream passing over the several points of the vehicle. This is made possible by the fact that the portion of the apparatus which is to project into the air stream may be made extremely small so as not to cause substantial perturbation of the moving air stream.

One object of the present invention is to provide an improved method and apparatus for accurately measuring the velocity of a moving fluid flow stream.

Another object of the present invention is to provide an improved velocity sensor in which a fluid jet stream is directed through a fluid flow stream whose velocity is to be measured, and the relative position of a jet transmitter and a jet receiver is translated a distance proportional to the velocity of the fluid flow stream, whereby the distance indicates the measured velocity of the fluid flow stream.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

DESCRIPTION OF THE PREFERRED EMBODIMENT

Figure 1:
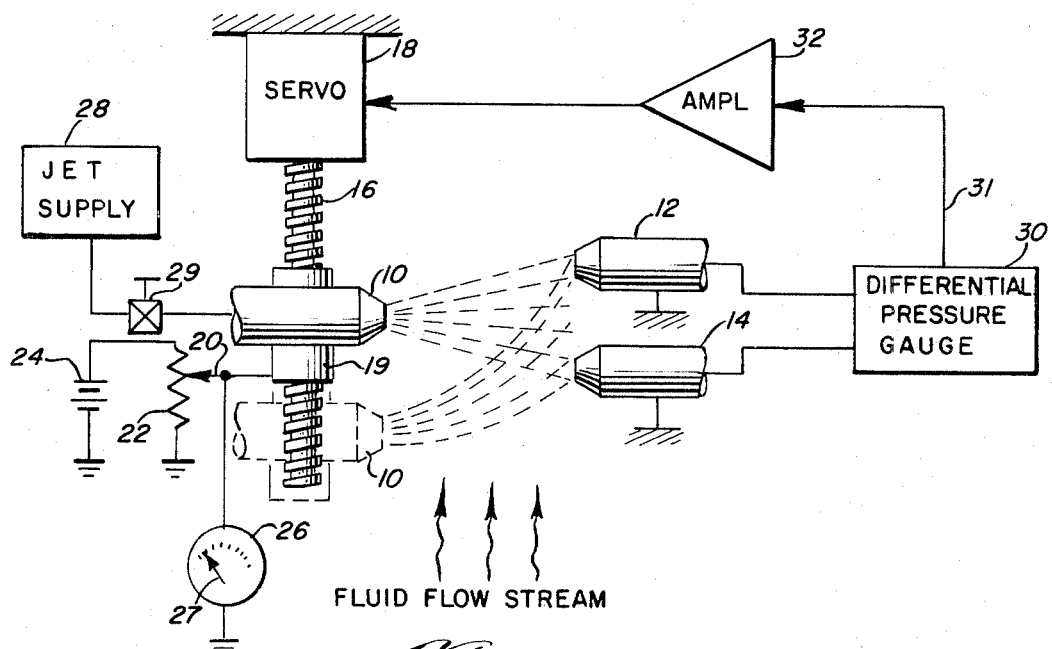
FIG. 1 is a schematic diagram illustrating a fluidic fluid stream velocity detection apparatus in accordance with the present invention.

Referring now to the drawings, there is shown in FIG. 1 a preferred embodiment of a fluid flow stream velocity measuring apparatus in accordance with the present invention. As illustrated in the drawing, a supply jet nozzle 10 is axially disposed opposite two receiver nozzles 12 and 14, and is initially positioned along an axis midway between the axes of the receiver nozzles 12 and 14. It will be noted that the supply jet 10 is movably mounted on a threaded shaft 16 which, when rotated by the servo drive means 18, causes the jet 10 to be displaced laterally along the axial direction of the threaded member 16.

Also connected to the mounting means 19 which carries the supply jet 10 is the arm 20 of a potentiometer 22 which is energized by a voltage supply means 24. As the arm 20 of the potentiometer is moved relative to the resistance 22, the voltage supplied to the indicator 26 is varied so as to cause the needle 27 to deflect and provide an indication of the velocity component of the fluid flow stream, as will be more fully explained below.

A jet supply means 28 is provided for furnishing a continuous flow of air or other suitable fluid to the jet nozzle 10 which directs the fluid transmissions across the path of the incident fluid flow stream toward the detectors 12 and 14. A throttle valve means 29 is also provided in the tubulation connecting supply means 28 to the nozzle 10 so that the flow rate of the jet stream may be selectively regulated.

Where the range of velocities over which the detection apparatus carrying vehicle can travel is great, it may be necessary to provide step increases in the flow rate of the jet stream in order to have sufficient energy to permit it to cross the fluid flow stream and exert influence upon the detectors 12 and 14. This could be accomplished by variable settings of the throttle valve 29 along with appropriate concomitant changes in the scale of the indicator 26. For each change in jet velocity, a different calibration factor is necessary for indicator 26. In the alternative, a similar effect could be obtained by shortening the distance between the jet nozzle 10 and the receivers 12 and 14.

The receivers 12 and 14 are connected to a differential pressure gauge 30 which provides an error signal which is responsive to the difference in the fluid pressures to which the respective nozzles are subjected. This error signal is applied through a lead 31 to an amplifier 32 wherein it is amplified and fed to the servomechanism 18 which, by rotation of the shaft 16, causes the nozzle 10 to be displaced along the axis of the shaft 16 as indicated.

When the nozzle 10 is in the position shown and there is no incident fluid flow stream flowing between the nozzle 10 and receivers 12 and 14, e.g., the support vehicle is at rest, the flow of fluid from the nozzle 10 is equally directed into both of the nozzles 12 and 14. As a result, no pressure differential therebetween is detected by the gauge 28, and therefore no error signal is fed to the servo 18. However, upon subjecting the jet stream to a fluid flow stream which intersects it in a direction transverse to its axis as illustrated in FIG. 1, the jet stream is caused to be diverted upwardly and equal pressures no longer appear in the receiver nozzles 12 and 14. Consequently, the differential pressure gauge 28 senses the difference in pressure, and produces an error signal which, when amplified by the amplifier 32, causes the servo drive means 18 to rotate the threaded shaft 16 and displace the nozzle 10 in a direction which will tend to equalize the pressures detected by the receiver nozzles 12 and 14.

As is illustrated in the drawing by the dashed lines, one fluid flow stream condition is shown wherein the nozzle 10 has been moved to the position indicated so as to cause the jet stream being emitted from the nozzle 10' to cause equal fluid pressures in the receiver nozzles 12 and 14. It can be shown that, for a given jet velocity from nozzle 10, the new position 10' of the nozzle is directly related to the velocity of the fluid flow stream which is flowing normal to the jet stream emitted by the supply jet 10, and that by using the potentiometer indication means 20, 22 and the meter 26, which is calibrated in terms of fluid flow velocity, an accurate indication of the velocity of the incident fluid flow stream can be readily obtained.

Certain modifications in the apparatus of FIG. 1 may be made without departing from the teachings of the invention. In place of the translatable jet nozzle 10, multiple fixed jet nozzles can be spaced along the longitudinal axis corresponding to screw 16. As a pressure differential is sensed, the air stream from jet supply 28 can be switched to another jet nozzle, until equal pressures are obtained at the receivers 12 and 14. For interpolation, more than one jet nozzle 10 could be active at one time, with appropriate changes in the calibration factor of indicator 26. Such a plurality of jet transmitters make possible a digital indication of the fluid flow stream velocity.

Figure 2:
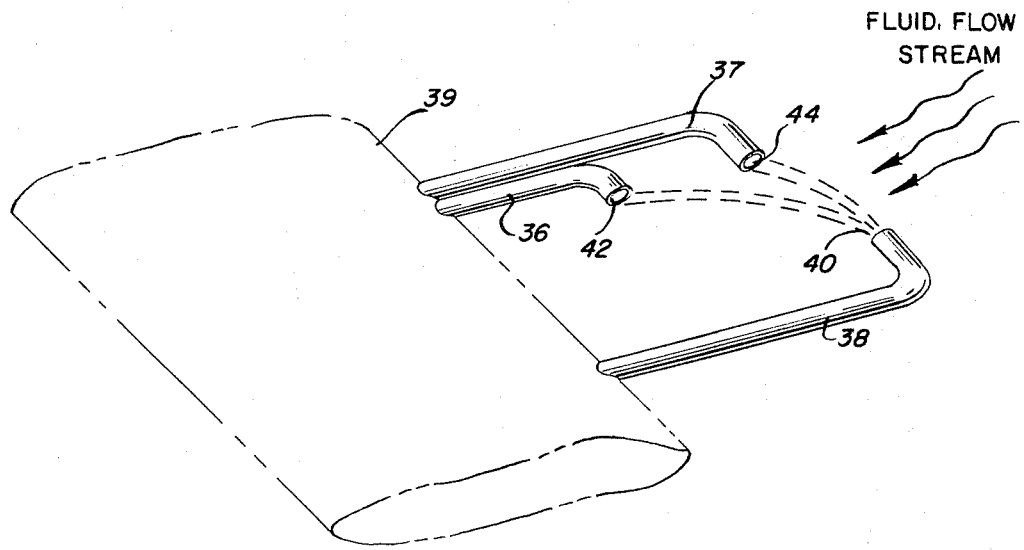
FIG. 2 illustrates an exemplary form in which the detection apparatus shown in FIG. 1 may be embodied.

In FIG. 2 of the drawing, an exemplary physical embodiment of the device is illustrated. Tubular housing members 36, 37 and 38 are shown extending from a wing-shaped member 39 which houses the mechanics of the system. The member 39 may be a portion of the wing of a conventional aircraft or may be an independent aerodynamically shaped member which can be attached to any suitable portion of a land, sea or air vehicle.

A jet nozzle orifice 40 is provide in tubular member 38 opposite detector apertures 42 and 44 in the tubular members 36 and 37. Whereas the members 36, 37 are fixedly mounted to the wing-member 39, the member 38 is adapted to allow movement in its axial direction so as to enable the balancing of the pressure signals received by detectors 42 and 44 as the velocity of the fluid flow stream relative to the detector structure increases. In a manner similar to that described above with relation to FIG. 1, the position of the projecting member 38 with respect to the wing-member 39, i.e., the position of jet orifice 40 with relation to detectors 42 and 44, is directly related to and indicative of the velocity of the fluid flow stream passing through the detector apparatus.

Figure 3:
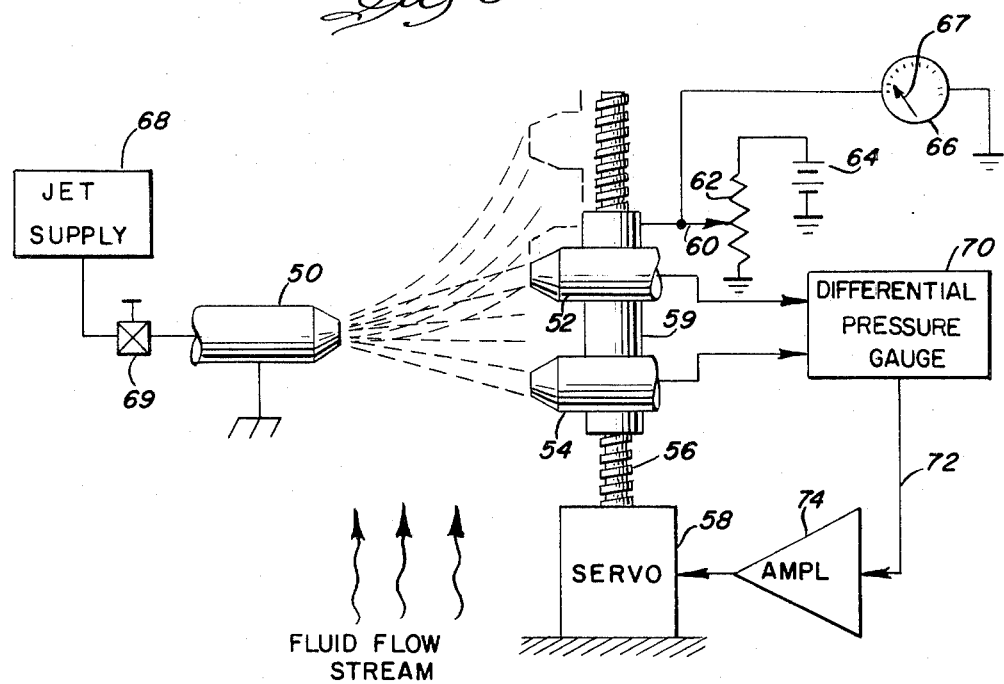
FIG. 3 is a schematic diagram illustrating an alternate embodiment of a fluid stream velocity detection apparatus in accordance with the present invention.

Referring now to FIG. 3 of the drawing, an alternate embodiment of the present invention is depicted wherein the detector structure is displaceable instead of the jet means. In a manner similar to that shown in FIG. 1, a supply jet nozzle 50 is disposed opposite two receiver nozzles 52 and 54 which are initially positioned directly opposite the jet nozzle 50. It will be noted, however, that in this alternate embodiment the receiver nozzles 52 and 54 are displaceably mounted on a threaded shaft 56 which, when rotated by the servo drive means 58, causes the detection apparatus to be displaced laterally along the axial direction of the threaded member 56.

Also connected to the mounting means 59 which carries the receivers 52 and 54 is the arm 60 of a potentiometer 62 which is energized by a voltage supply means 64. As the arm 60 of the potentiometer is moved relative to the resistance 62 in response to the movement of the carrier 59, the voltage supply to an indicator 66 is varied so as to cause the needle 67 thereof to deflect and provide an indication of the velocity of the fluid flow stream.

A jet supply means 68 is provided for furnishing a continuous flow of air or other suitable fluid transmissions to the jet nozzle 50 for direction across the path of the incident fluid flow stream to the detectors 52 and 54. A throttle means 69 is provided in the tubulation connecting supply means 68 to the nozzle 50 so that the flow rate of the jet stream can be selectively regulated where required. Such regulation also requires a change in the scale factor of indicator 66, as previously described. A differential pressure gauge 70 is operatively connected to the receivers 52 and 54, and provides an error signal which is responsive to the difference in the fluid pressures to which the respective nozzles are subjected. This error signal is then applied through lead 72 to an amplifier 74 wherein it is amplified and fed to the servomechanism 58 which, by rotation of the shaft 56, causes the receiver nozzles 52 and 54 to be displaced along the axis of the shaft until the error signal is cancelled and a zero difference in pressure exists at receivers 52 and 54.

Modifications similar to the modifications described for FIG. 1 can be made in the apparatus of FIG. 3 without departing from the teachings of the invention. In place of the translatable receiver nozzles 52 and 54, multiple fixed receiver nozzles can be spaced along the longitudinal axis of screw 56. As a pressure differential is sensed, the gauge 70 can be switched across adjacent pairs of receiver nozzles until equal pressures are sensed. The location of such receiver nozzles, relative to a pair of receiver nozzles directly opposite jet nozzle 50, indicates the velocity of the fluid flow stream. It is to be understood that the positioning of the receiver nozzles in this embodiment, or the jet nozzle in the previous embodiment, can be carried out manually instead of automatically as illustrated.

Figure 4:
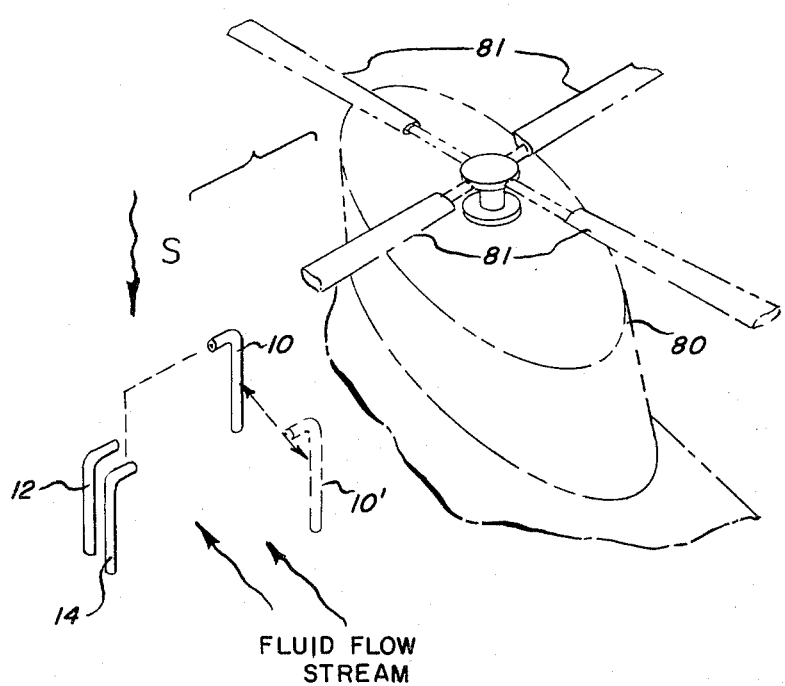
FIG. 4 is a schematic diagram illustrating another embodiment of the invention, in which the detection apparatus is provided with a steady state offset to compensate for the downwash from the rotor of a helicopter.

In FIG. 4, another exemplary form of the invention is illustrated, similar to the form shown in FIG. 1. The invention is sensitive to fluid velocities occurring in the plane of measurement formed by the jet nozzle and the pair of receiver nozzles. Should the fluid flow stream have a velocity component S which is perpendicular to the plane of measurement, it is possible for the jet stream to be deflected out of the plane of measurement. For example, in a helicopter 80, the rotor blades 81 create a perpendicular air stream component in the form of a down-draft S under the rotor, which can bend the stream from jet nozzle 10 out of the measurement plane.

To compensate for air stream component S, the plane of the supply jet 10 is elevated above the plane of the two detectors 12 and 14. The distance of elevation is of an amount sufficient to compensate for the presence of down-draft S, which otherwise would deflect the jet stream so that detectors located in the plane of the supply jet might not be able to sense a usable signal. The amount of elevation is selected taking into account the range of jet velocities to be employed and the range of down-draft velocities S to be encountered. Except as it affects the level of the usable signal available at the detectors 12 and 14, the magnitude of the down-draft velocity S does not enter into the measurement of the fluid stream velocity. As previously related in FIG. 1, the supply jet 10 is movable upstream relative to the fluid flow stream, such as to a position 10', by the servo means previously disclosed, until the pressures detected at receivers 12 and 14 are equal. The distance the supply jet 10 is moved upstream is still a measure of the fluid stream velocity.

The steady state offset illustrated in FIG. 4 will usually be sufficient for the range of down-drafts encountered from helicopter rotors 81. Although changes in the down-draft velocity S will occur, the jet stream reaching the receivers 12 and 14 will have a sufficient magnitude to provide a usable signal. Should the velocity component S normal to the plane of measurement have a widely varying magnitude, so that a single steady state offset is not sufficient, additional servo drive means may be provided to translate the supply jet 10 vertically in the drawings, i.e., along an axis normal to the plane of measurement, until the jet stream is again within the range of detectors 12 and 14.

Figure 5:
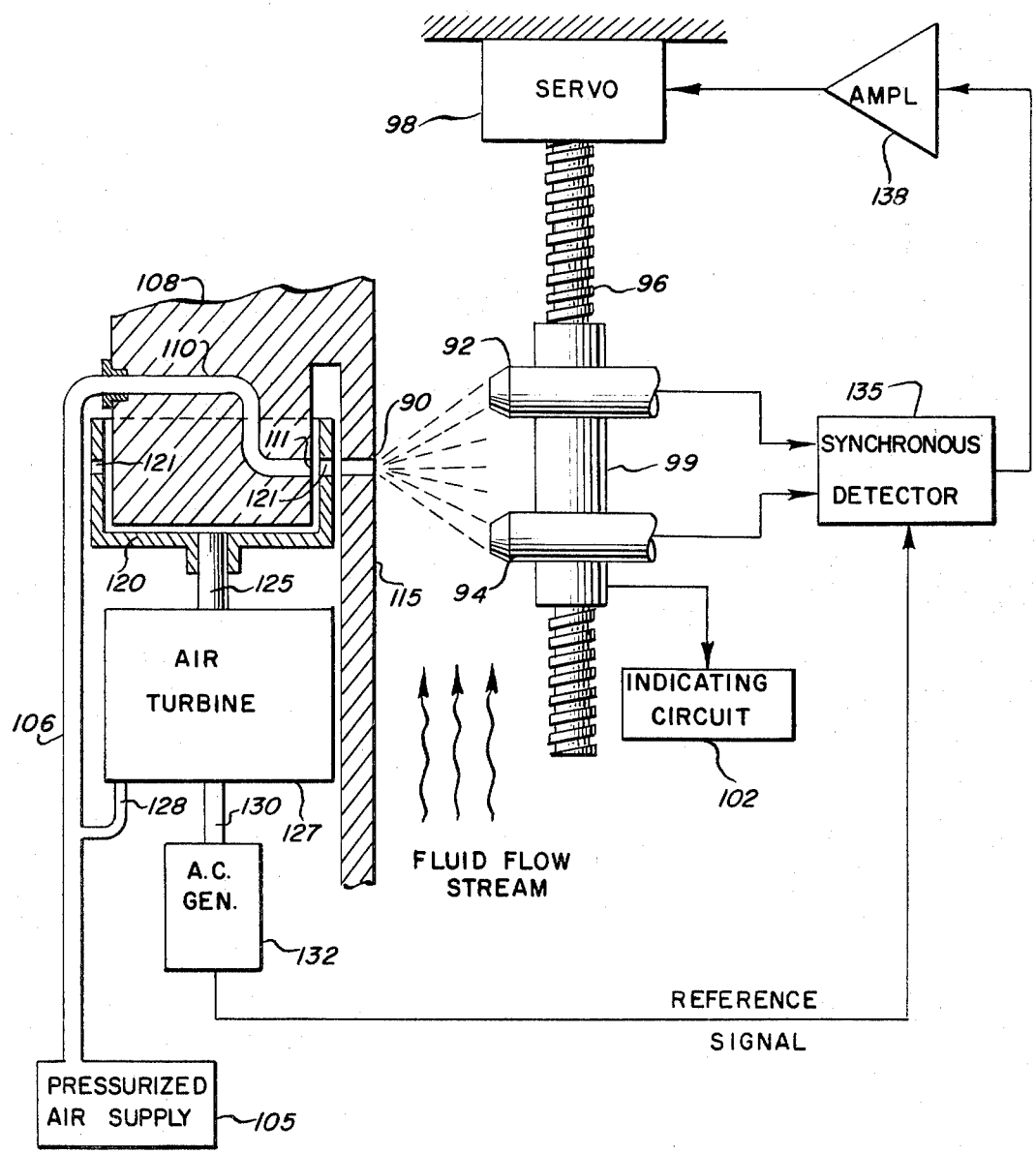
FIG. 5 is a schematic diagram illustrating a further embodiment of a fluid stream velocity detection apparatus, using synchronous detection.

In FIG. 5, the fluidic sensor has been modified to generate a modulated fluid jet stream, so that the advantages of synchronous detection may be used on the excess pressure signals captured by the fluid receivers. The modified arrangement is shown for a system similar to the system of FIG. 3. A jet nozzle 90 IS disposed opposite to receive nozzles 92 and 94 which are initially positioned directly opposite the jet nozzle 90. The receiver nozzles 92 and 94 are displaceably mounted on a threaded shaft 96 which, when rotated by the servo drive means 98, causes the detection apparatus to be displaced laterally along the axial direction of the threaded member 96. Also connected to a carrier or mounting means 99 which carries receivers 92 and 94 is an input to an indicating circuit 102 which provides a visual indication of the location of the carrier 99 along the threaded member 96, to thereby indicate the velocity of the fluid flow stream. The indicating circuit 102 may be similar to the potentiometer arrangement illustrated in the other drawings.

Jet nozzle 90 is supplied with a fluid jet that is modulated so as to generate a series of regularly spaced pulses. Pressurized fluid is supplied from a source of pressurized air supply 105 and is connected through tubing 106 to a solid housing 108 having a hollow, tubular channel 110 with an opening in coaxial alignment with tubing 106. The opposite end of channel 110 terminates in an aperture 111 opening into a hollow section within housing 108. Nozzle 90 consists of a tubular opening provided in a wall 115 of housing 108. The nozzle opening 90 is coaxial with the aperture 111 of the channel 110, so that pressurized fluid from aperture 111 will pass through the nozzle 90 to form the fluid jet stream.

In order to modulate the fluid jet stream, a cup-shaped member 120 is disposed between nozzle 90 and aperture 111. Cup 120 includes a plurality of radially extending apertures 121 spaced equally around the periphery of the cup 120, and located at the same height as the aperture 111 and nozzle 90. The cup 120 is affixed to a shaft 125 which is rotated by an air turbine 127 having an input 128 connected to the pressurized air supply 105.

When supply 105 is effective, the turbine 127 is supplied with pressurized air and begins to rotate at a high speed, thereby rotating cup 120 and causing each of the plurality of apertures 121 to pass adjacent the nozzle 90. When each aperture 121 is rotated adjacent and coaxial with nozzle 90 and the outlet of channel 110, pressurized air passes to nozzle 90 and generates a jet pulse. As the aperture 121 rotates beyond this coaxial position, the cup 120 blocks the supply of pressurized air and thus terminates the jet until the next aperture 121 is rotated into coaxial alignment. Thus, the jet supply for nozzle 90 is modulated at a regular rate corresponding to the number of apertures 121 per unit of time passing adjacent nozzle 90.

Air turbine 127 has an additional shaft 130 which is connected to an AC generator 132 to generate an AC electrical output or reference signal having a frequency directly proportional to the rate of rotation of the turbine 127, which in turn is directly related to the modulation rate of the jet from nozzle 90. The AC generator 132 thus has a frequency which is directly proportional to the number of pulses per unit of time emitting from nozzle 90.

In place of the differential pressure device previously used, a synchronous detector 135 has a pair of inputs connected to the pressure receivers 92 and 94. In addition, an input reference signal is supplied from AC generator 132. Detector 135, per se, operates in a known manner using synchronous detection techniques, so that all input signals from receivers 92 and 94 are disregarded except those having precisely the frequency of the modulated jet stream. The difference between such detected signals is used to form an error signal which is amplified by an amplifier 138 and used to drive the servo 98, as previously described. If desired, electromechanical servoing may be associated with each receiver detector 92 and 94 so that equal phases are received which are in phase with the reference signal from AC generator 132. In this manner, the advantages of synchronous detection are applied to the present invention, to improve the signal-to-noise ratio of the system.

As will be readily apparent to those of skill in the art, such apparatus will have utility in many areas wherein it is required that the velocity of a flowing fluid stream be measured. Although the specific embodiment disclosed here is described as being suitable for gaseous conditions, it should be apparent that the apparatus will likewise be useful in applications where the fluid flow stream is a liquid. Furthermore, it is contemplated that for certain applications it may be desirable to utilize an aromatic or other gaseous fluid in the jet means which can be detected by suitable gaseous detector means rather than the pressure sensitive means disclosed herein.

I claim:

1. Apparatus for measuring the velocity of a fluid flow stream in a predetermined direction, comprising:
    jet means disposed so as to direct a fluid jet stream across said fluid flow stream;
    detector means disposed opposite said jet means for detecting the jet stream as it passes through said flow stream;
    means for changing the relative position of said jet means and said detector means so as to cause the jet stream to intersect the detector means even though the flow path of said jet stream be deflected by the flow stream as it passes therethrough; and
    indicator means responsive to said relative position of said jet means and said detector means for providing an indication of the velocity of the fluid flow stream relative to said apparatus.

2. The measuring apparatus of claim 1 wherein said detector means includes at least two fluid pressure sensitive means disposed in side-by-side relationship opposite said jet means and lying in a plane parallel to the direction of flow of said fluid flow stream.

3. The measuring apparatus of claim 2 wherein said detector means further includes a signal comparison means for comparing the outputs of said pressure sensitive means and producing an error signal in proportion to the difference in pressure between the fluid pressure sensitive means.

4. The measuring apparatus of claim 3 wherein said position changing means is a servo means responsive to said error signal for changing said relative position of said jet means and said detector means until said error signal goes to a null condition.

5. The measuring apparatus of claim 1 wherein said jet means is translatable along an axis parallel with said predetermined direction, said position changing means moving said jet means along said axis until said detector means detects the jet stream in the same manner as when the fluid of said flow stream is stagnant, said indicator means being responsive to the position of said jet means to indicate the velocity of said fluid flow stream.

6. The measuring apparatus of claim 5 wherein said detector means includes a plurality of fluid pressure sensitive means disposed in side-by-side relationship opposite said jet means, differential pressure means coupled to said plurality of pressure sensitive means for generating a differential signal indicating the difference in pressure between said plurality of pressure sensitive means, said indicator means further including means responsive to said differential signal and to the relative position of said jet means for providing an indication of the velocity of said fluid flow stream relative to said apparatus.

7. The measuring apparatus of claim 1 wherein said detector means is translatable along an axis parallel with said predetermined direction, said position changing means moving said detector means along said axis until said detector means detects the jet stream in the same manner as when the fluid of said flow stream is stagnant, said indicator means being responsive to the position of said detector means to indicate the velocity of said fluid flow stream.

8. The measuring apparatus of claim 7 wherein said detector means includes a plurality of fluid pressure sensitive means disposed in side-by-side relationship opposite said jet means, differential pressure means coupled to said plurality of pressure sensitive means for generating a differential signal indicating the difference in pressure between said plurality of pressure sensitive means, said indicator means further including means responsive to said differential signal and to the relative position of said detector means for providing an indication of the velocity of said fluid flow stream relative to said apparatus.

9. The measuring apparatus of claim 1 wherein said jet means includes means for modulating said fluid jet stream, means for generating a signal having a frequency corresponding to the frequency of modulation of said fluid jet stream, and said detector means includes means responsive to said signal for synchronously detecting said jet stream.

10. The measuring apparatus of claim 9 wherein said modulating means includes a device driven at a speed proportional to the frequency of modulation of said fluid jet stream, and said generating means comprises an AC generator driven by said device for producing an AC signal having a frequency corresponding to the frequency of modulation of said fluid jet stream.

11. The measuring apparatus of claim 10 wherein said jet means includes a source of pressurized fluid, nozzle means disposed so as to direct said fluid jet stream across said fluid flow stream to said detector means, first tubing means connecting said pressurized source to said nozzle means, and obstruction means located in the path of said first tubing means and driven by said modulating device to alternately pass and block said pressurized fluid to said nozzle means.

12. The measuring apparatus of claim 11 wherein said obstruction means comprises a member having a plurality of apertures located therein, each aperture being movable by said modulating device into coaxial alignment with said first tubing means to allow the pressurized fluid to pass therethrough.

13. The measuring apparatus of claim 1 for measuring velocity of a fluid flow stream in a first direction when the fluid flow stream has a velocity component along a direction normal to said first direction, wherein said jet means is disposed along said normal direction upstream from said detector means to maintain the impingement of the fluid jet stream upon the detector means.

14. The measuring apparatus of claim 13 wherein said detector means includes a plurality of air pressure sensitive means disposed in side-by-side relationship and lying in a sensitive plane parallel to the direction of airflow along said first direction, and said jet means is disposed so as to direct a fluid jet stream in a plane parallel with said sensitive plane and offset therefrom, said jet means being located upstream from said sensitive plane.

15. A method of determining the flow rate of a moving fluid stream, comprising the steps of:
 forming a fluid jet stream;
 directing the jet stream across the path of said moving fluid stream;
 sensing at spaced locations the pressure of the fluid jet stream after it has passed a given distance through the moving fluid stream;
 relatively moving the jet stream past the spaced locations until the pressure sensed at the spaced locations is equal; and
 scaling the relative distance between the jet stream and the spaced locations to provide a measure of the flow rate of the moving fluid stream.

16. The method of claim 15 wherein the step of relatively moving comprises moving the jet stream relative to the spaced locations.

17. The method of claim 15 wherein the step of relatively moving comprises moving said spaced locations relative to the jet stream.

* * * * *